United States Patent

[11] 3,624,103

[72] Inventors: Franco De Martiis, Turin; Edoardo Arrigoni-Martelli, Milan; Teresio Tamietto, Turin, all of Italy
[21] Appl. No.: 822,320
[22] Filed: May 6, 1969
[45] Patented: Nov. 30, 1971
[73] Assignee: Instituto Biologico Chemioterapico "ABC" S.p.A. Turin, Italy
[32] Priority: May 21, 1968
[33] Italy
[31] 51749 A/68

[54] 3-INDOLEACETOHYDROXAMIC ACIDS
5 Claims, No Drawings

[52] U.S. Cl. ................................................ 260/326.13A, 260/326.13 R, 424/274
[51] Int. Cl. ............................................... C07d 27/56
[50] Field of Search .................................. 260/326.13, 326.13 A

[56] References Cited

OTHER REFERENCES

Wagner et al., Synthetic Organic Chemistry, (1953) p. 569

*Primary Examiner*—Alex Mazel
*Assistant Examiner*—Joseph A. Narcavage
*Attorney*—Sughrue, Rothwell, Mion, Zinn & Macpeak CLAIM: 2-methyl-5-methoxy-3-indoleacetohydroxamic acid compounds of the formula

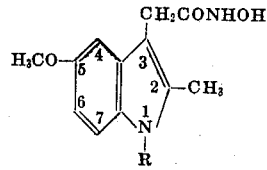

wherein R is a member selected from the group consisting of hydrogen, phenylmethyl, allyl, vinyl, isopropenyl, benzoyl, chlorobenzoyl, methoxybenzoyl, and thiomethylbenzoyl, and process for preparing same. These compounds exhibit excellent anti-inflammatory, antipyretic and analgesic effects.

3-INDOLEACETOHYDROXAMIC ACIDS

SUMMARY OF THE INVENTION

This invention relates to derivatives of the 2-methyl-5-methoxy-3-indole-acetohydroxamic acid of the general formula

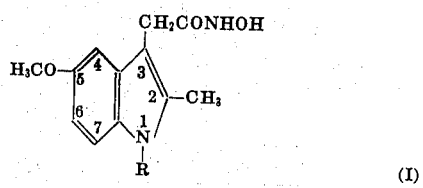

(I)

wherein R stands for a hydrogen atom, an aryl-alkyl group, an alkene or an aroyl group. Phenylmethyl is preferred among aryl-alkyls. Typical representatives of the alkene substituent are allyl, vinyl and isopropenyl, allyl being preferred. The aroyl group may be benzoyl, chlorobenzoyl, methoxybenzoyl, thiomethylbenzoyl or, preferably, p-chlorobenzoyl.

The above-mentioned compounds result to be effective as anti-inflammatory agents on the following tests: edemas from carrageenan, edemas from formalin, and polyvinyl-pyrrolidone sponge granuloma. They are moreover active as antipyretic and analgesic agents and are characterized by low acute toxicity, their therapeutical index being therefore particularly favorable.

DETAILED DESCRIPTION OF THE INVENTION

The compounds may be prepared by reacting esters of lower aliphatic alcohols (one to four carbon atoms) of 2-methyl-5-methoxy-3-indoleacetic acid R-substituted at position 1 (wherein R is as defined hereinbefore) with hydroxylamine in anhydrous methanol at elevated temperature according to reaction II, or by reacting at room temperature a chloride of the said acid with hydroxylamine in a lower alcohol or water, according to reaction III:

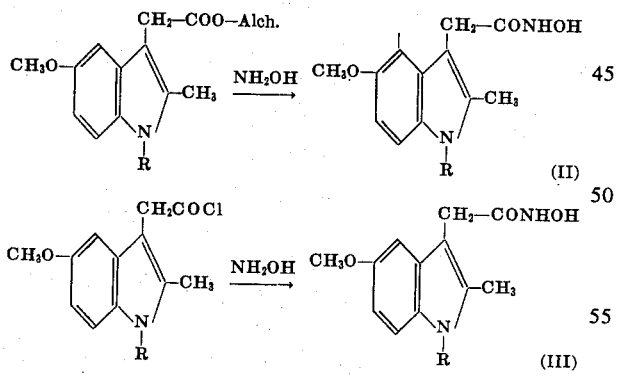

EXAMPLE I

Part 1—Preparation of 1-allyl-2-methyl-5-methoxy-3-indoleacetic acid methyl ester:

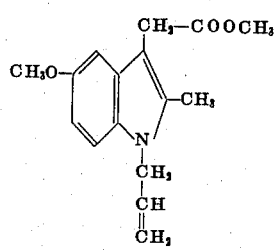

(IV)

0.04 Moles sodium hydride (NaH in 20 percent Merck dispersion) are vigorously stirred during 1 hour, while protected against moisture with 20 ml. freshly distilled dimethylformamide (DMF) and subsequently slowly admixed while stirring with 0.0399 moles of 2-methyl-5-methoxy-3-indoleacetic acid methyl ester dissolved in 24 ml. DMF while externally cooling by means of an ice bath. Stirring and cooling are continued during about 1 hour until hydrogen gas has fully evolved. A solution is 20 ml. DMF of 0.0415 moles allyl chloride is dropped through a dropping funnel and allowed to react during 1 hour while further stirring and cooling. The container is sealed and placed into a refrigerator during at least 48 hours.

On expiration of this period the reaction mass is poured in 400 ml. cold water, stirred and allowed to stand a few hours in a refrigerator: a precipitate is formed consisting of unctuous lumps, which are recovered by filtering, lavishly washed on the filter with water, dried in vacuum over $CaCl_2$ and thoroughly repeatedly washed with ligroin (b.p. 40°–70° C.).

The brown-colored solid lumpy mass is purified by consecutively crystallizing from hot aqueous ethyl alcohol, 5.750 g. of 1-allyl-2-methyl-5-methoxy-3-indoleacetic acid methyl ester are obtained in a white or slightly brown crystalline mass of elongated prisms, melting point 72°–74°, 75° C. the ester being pure enough for the subsequent reactions. By further crystallizing from a little methanol a perfectly white ester, m.p. 74°–75 C. is obtained.

Found: C% 70.16 (calc. 70.30); H% 7.09 (7.00); N% 5.13 (5.12). The ester rapidly reduces potassium permanganate in an acetone solution and yields through hydrolysis with 0.5 N alcoholic potassium hydroxide solution the corresponding free acid: melting point 104°–106° C. (crystallized from cyclohexane).

Part 2—Preparation of alcoholic solution of hydroxylamine 0.920 g. sodium are dissolved in 15 ml. anhydrous methanol. This solution is admixed with a solution of 1.4 g. hydroxylamine hydrochloride in 15 ml. methanol. The precipitated sodium chloride is promptly filtered off and the volume of the filtered solution is brought to 42 ml. by means of further methanol. The solution may be conserved a few hours only, at low temperature.

Part 3—1-Allyl-2-methyl-5-methoxy-3-indoleacetohydroxamic acid (I/A)

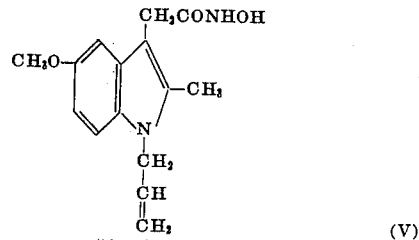

(V)

0.910 g. (one three-hundredth M) of the 1-allyl-2-methyl-5-methoxy-3-indoleacetic acid methyl ester are dissolved at elevated temperature in 4 ml. anhydrous methanol and admixed all at a time with 14 ml. of the methanol solution of hydroxylamine (one one-hundred fifthieth M) and refluxed during half an hour.

The methanol is thereupon evaporated in vacuum, the residue being dissolved in 10–11 ml. water, filtering if necessary. The clear alkaline-reacting solution is neutralized (pH 6– 6.5) while cooling with 2N hydrochloric acid. A thick oily product precipitates, which sets either at once or with time, this product being separated by filtering, repeatedly thoroughly washed with a little water and purified by consecutive crystallizations from hot benzene. The result is 0.550 g. I/A in the form of a white mass of tiny needles (m.p. 131°–133°, 135° C. (dec.)).

Found: C% 65.38 (calc. 65.60); H% 6.65 (6.65); N% 9.93 (10.21). The product is soluble in alkaline-reacting solutions, but not in bicarbonate; when dissolved in methanol, it turns violet on adding an aqueous solution of a ferric salt.

EXAMPLE 2

1-Benzyl-2-methyl-5-methoxy-3-indoleacetohydroxamic acid (I/B)

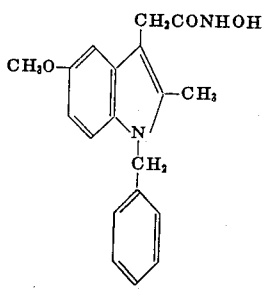

(VI)

1.080 g. (about one three-hundredth M) of 1-benzyl-2-methyl-5-methoxy-3-indoleacetic acid methyl ester m.p. 72°–75 C. (prepared similarly as described in example 1, part 1, in respect of the 1-allyl-derivative) are dissolved at elevated temperature in 4 ml. anhydrous methanol, then refluxed with 8 ml. of a methanol solution of hydroxylamine (example 1, part 2) during 15 minutes.

The solution is thereupon acidified with concentrated hydrochloric acid up to about pH=3 and the solvent is evaporated in vacuum; the residue is finely disintegrated in 20 ml. water and the undissolved matter is, separated by filtering, further washed with water, dried and carefully repeatedly purified from benzene yielding about 0.500 g. of a white mass of tiny needles, melting point 145°–149° C. (dec.) (I/B).

Found: C% 69.89 (calc. 70.35); H% 6.21 (6.21); N% 8.56 (8.63). The product is soluble in alkaline-reacting solutions and turns violet on adding a ferric salt.

EXAMPLE 3

Part 1—1-p-chlorobenzoyl-2-methyl-5-methoxy-3-indoleacetic acid chloride

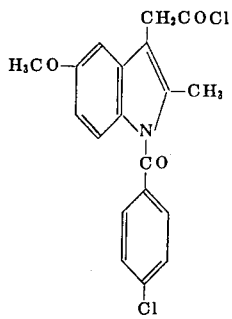

(VII)

1 g. of 1-p-clorobenzoyl-2-methyl-5-methoxy-3-indoleacetic acid (J. Am. Chem. Soc. 85, 488–489 (1963)) is treated in a nitrogen stream with 10 ml. thionyl chloride in which it promptly dissolves. The solution is quickly evaporated in vacuum and the residue (which typically is of a deep brown-green color) is distempered, twice or three times, with a few ml. anhydrous benzene which is removed in vacuum each time. The resulting residue is thoroughly distempered with 5 ml. anhydrous ether which dissolves most of the color impurities, and separated by filtering, purified by crystallizing from plenty of anhydrous ether, yielding a crystalline mass of needles of straw-yellow color, m.p. 124°–127° C. Yield: 0.700 g.

Found: Cl% 18.62 (calc. 18.84).

The product is relatively stable towards water and aqueous alkalies in which it proves to be insoluble even after dwelling therein several hours at room temperature. It reacts, better if at elevated temperature, with lower alcohols with which it forms the corresponding esters, and with ammonia under suitable conditions for forming the amide (m.p. 219°–221° C.).

Part 2—1-p-chlorobenzoyl-2-methyl-5-methoxy-3-indoleacetohydroxamic acid (I/C)

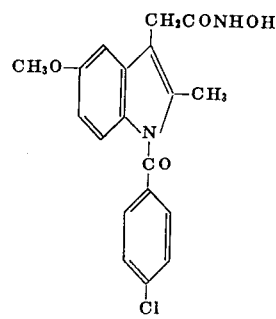

(VIII)

A solution of 1.330 g. sodium hydroxide in 20 ml. water is slowly admixed with 2.330 g. hydroxylamine hydrochloride while cooling, whereupon 1 g. chloride of 1-p-chlorobenzoyl-2-methyl-5-methoxy-3-indoleacetic acid is distempered in this neutral or slightly alkaline solution by vigorously stirring during a few minutes.

The acid chloride reacts with the free hydroxylamine with considerable rapidity apparently without dissolving. The reaction is completed when a sample of the suspension shows to become clear on adding aqueous alkali. The crystalline pale-yellow mass of I/C product is separated by filtering, lavishly washed with water and dried in vacuum. The crude product yield is actually quantitative. The product is purified with excellent yields by repeatedly crystallizing from hot dioxane and washing with ether; m.p. 181°–182° C. (dec.).

Found: C% 61.16 (calc. 61.21); H% 4.72 (4.60); N% 7.41 (7.51); Cl 9.73 (9.51).

The product is soluble at elevated temperature in many organic solvents, from which it may be recrystallized, but is then typically obtained in a less pure condition. It gives rise in alcohols to the peculiar reaction of hydroxamic acids with ferric salts; is soluble in strong alkalies in which, however, it is quickly hydrolyzed even at room temperature and forms the debenzoylated product I/D (dealt with hereinafter).

EXAMPLE 4

2-Methyl-5-methoxy-indole-3-acetohydroxamic acid (I/D)

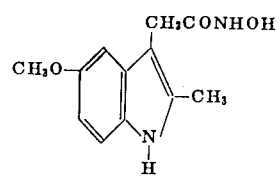

IX 2.75 g. one one-hundredth M) of 2-methyl-5-methoxy-3-indoleacetic acid tert-butyl ester are refluxed with 28 ml. of methanol solution of hydroxylamine (compare example 1, part 2) during 3½. The solution is cooled and filtered, if slightly opalescent, the solvent being evaporated in vacuum; the residue is taken up with water and further alkalized with a little sodium hydroxide. The small amount of insoluble starting product which is still unreacted is filtered off, and the solution is treated with 2N hydrochloric acid up to about pH=5. The resulting precipitate is separated, washed with an aqueous saturated solution of sodium bicarbonate, then with water and dried; purification is effected by crystallizing from dioxane, followed by crystallization from anhydrous alcohol, the result being 1.75 g. I/D, melting point 172°–174° C. (dec.), in a white crystalline mass.

Found: C% 61.68 (calc. 61.52); H% 5.89 (6.02); N% 11.87 (11.96).

This product may alternatively be obtained, as mentioned hereinbefore, by alkaline hydrolysis of I/C at room temperature.

For this purpose, 1 g. I/C is dissolved in a solution of 2 ml. sodium hydroxide in 10 ml. water. The originally yellow solution readily tends to become paler and is filtered after a few minutes, acidified with 2N hydrochloric acid till thorough precipitation (pH about 5), admixed with sodium bicarbonate up to about pH-8.3, well stirred, the undissolved product (I/D) being separated by filtering and purified as described above.

By a strong acidification of the mother liquor of the hydrolysis reaction p-chlorobenzoic acid can be obtained as byproduct of the hydrolysis.

Note: The melting points of the compounds obtained in the examples were determined with a Kofler microscope equipped with heating table. The thermometric values have not been corrected.

PHARMACOLOGICAL INVESTIGATIONS

The compounds were submitted to the following investigations:

1. Determination of the 50 percent lethal dose ($LD_{50}$) on rats.
2. Determination of the inhibiting action towards the experimental edemas from
   a. carrageenan
   b. formalin
3. Determination of the inhibiting action towards the granuloma from polyvinylpyrrolidone sponge.
4. Determination of the analgesic action.
5. Determination of the antipyretic action.

The acompound employed as control was "indomethacin" (1-p-chlorobenzoyl-2-methyl-5-methoxy-317 -indolylacetic acid) on account of the chemical structure resemblances to the compounds tested.

1. Determination of the 50 percent lethal dose on rats:

The determination was carried out on albine rats of both sexes of average weight of 200 g. by oral administration of the compounds suspended in olive oil. The administered volume did not exceed 0.2 ml./100 g. The mortality percentage was ascertained 4 days after administration.

The results (which were elaborated by the statistical method of J. T. Litchfield Jr. et al. Journal of Pharm. Exp. Therap. 96, 99, 1949) are summarized in table 1.

TABLE 1

| Compound | $LD_{50}$ mg./kg. per os (with confidential limits) | Number of animals |
| --- | --- | --- |
| Indomethacin | 23 (16–31) | 65 |
| I/C | 96 (72–118) | 74 |
| I/D | 107 (81–128) | 62 |
| I/A | 79 (62–97) | 73 |
| I/B | 81 (68–104) | 79 |

2. Determination of the inhibiting action towards experimental edema from:
   a. carrageenan The determination was carried out on albine rats of both sexes of average weight of 150 g. The inflammation was induced by injecting into the subcutaneous tissue of left-hind paw 0.1 ml. of a 0.1 percent sterile physiological solution of carrageenan (Genulacta Karrageenan type L°100, Kobenhavns Pektin Fabrik, Lille Skensved, -y Denmark The intensity of the induced inflammation was estimated by measuring the volume of the paw by a pletisomometric method (immersion of the limb down to the tibiotarsal articulation into an overflow receptacle and measurement of the displaced liquid quantity). The difference between the limb volume before the injection of carrageenan and 5 hours later stands for the intensity of the edema.

The compounds were administered per os suspended in olive oil, by a volume not exceeding 0.2 ml./100 g. 1 hour before the carrageenan injection.

(Reference is made for further details of the method to: Arrigoni Martelli E. et al.: Il Farmaco ed. prat. 19, 134, 1964; Winter C. A. et al., Proc. Soc. exp. Biol. A. Med. 111, 514, 1963).

The results summarized in table 2a express the percentage inhibition of the edema.

TABLE 2a

| Compound | Dose mg./kg. | % inhibition ±S.E. | Number of animals |
| --- | --- | --- | --- |
| Indomethacin | 2.5 | 31.9±3.5 | 35 |
| Indomethacin | 5.0 | 39.7±2.9 | 30 |
| Indomethacin | 10.0 | 56.2±4.3 | 30 |
| I/C | 2.5 | 37.3±3.1 | 40 |
| I/C | 5.0 | 51.2±2.7 | 40 |
| I/C | 10.0 | 68.5±3.9 | 40 |
| I/D | 2.5 | 21.3±2.4 | 35 |
| I/D | 5.0 | 39.2±3.1 | 35 |
| I/D | 10.0 | 51.6±3.4 | 40 |
| I/A | 2.5 | 9.2±0.9 | 35 |
| I/A | 5.0 | 16.7±1.3 | 35 |
| I/A | 10.0 | 21.5±2.4 | 35 |
| I/B | 2.5 | 9.9±0.8 | 30 |
| I/B | 5.0 | 15.5±1.4 | 40 |
| I/B | 10.0 | 26.8±2.6 | 35 | b. Formalin

All experimental conditions are similar as previously described.

The inflammation was induced by injecting into the subcutaneous tissue of the left hind paw 0.1 ml. of a 1 percent formalin solution.

TABLE 2b

| Compound | Dose mg./kg. | % inhibition ±S.E. | Number of animals |
| --- | --- | --- | --- |
| Indomethacin | 2.5 | 19.5±1.6 | 35 |
| Indomethacin | 5.0 | 25.3±2.2 | 30 |
| Indomethacin | 10.0 | 39.6±3.1 | 35 |
| I/C | 2.5 | 21.3±1.5 | 30 |
| I/C | 5.0 | 33.4±2.1 | 35 |
| I/C | 10.0 | 44.5±2.4 | 35 |
| I/D | 2.5 | 16.5±2.5 | 35 |
| I/D | 5.0 | 27.3±3.6 | 40 |
| I/D | 10.0 | 40.2±4.9 | 40 |
| I/A | 2.5 | 8.5±1.9 | 30 |
| I/A | 5.0 | 13.6±3.2 | 30 |
| I/A | 10.0 | 19.3±3.8 | 35 |
| I/B | 2.5 | 8.9±1.6 | 35 |
| I/B | 5.0 | 12.5±2.8 | 35 |
| I/B | 10.0 | 19.5±3.4 | 35 |

3. Determination of the inhibiting action towards the granuloma from polyvinylpyrrolidone sponge.

The determination was carried out on albine rats of both sexes of average weight of 200 g. The animal was subjected to a slight anesthesia by ether and a polyvinylpyrrolidone sponge weighing about 20 mg. was introduced under the skin of the interscapular region.

The incision was sutured by a silk stitch. Beginning with the next day and during 8 consecutive days the compounds suspended in olive oil were orally administered by a volume not exceeding 0.2 ml./100 g. On the 9th day the animals were sacrificed; the granulomatous tissue formed and the sponge therein contained were carefully dissected from the surrounding tissues and weighed after standing 18 hours at 50° C.

The results are summarized in Table 3

| Compounds | Dose pro die during 8 days mg./kg. | Weight of granuloma mg.±S.E. | Number of animals |
| --- | --- | --- | --- |
|  |  | 164±13 | 12 |
| Indomethacin | 2.5 | 116±19 | 15 |
| Indomethacin | 5.0 | 107±21 | 15 |

| | | | |
|---|---|---|---|
| I/C | 2.5 | 105±13 | 20 |
| I/C | 5.0 | 97±21 | 20 |
| I/D | 2.5 | 129±15 | 20 |
| I/D | 5.0 | 112±16 | 20 |
| I/A | 2.5 | 142±19 | 15 |
| I/A | 5.0 | 126±21 | 20 |
| I/B | 2.5 | 143±13 | 15 |
| I/B | 5.0 | 132±18 | 20 |

4. Determination of the analgesic action

The determination was carried out on albine rats of both sexes of average weight of 150 g. The analgesic effect of the compounds was estimated by measuring the pressure exerted on the left hind paw inflammed by injection of brewer's yeast (0.1 ml./animal of a 20 percent solution) which causes painful reactions in the animal.

The procedure is described in detail by L. O. Randall et al.: Arch. in Pharmacodyn. 111, 409, 1957.

The compounds were orally administered suspended in olive oil (0.2 ml./100 g. 1 hour before inducing the phlogosis.

The results summarized in table 4 express the percentage inhibition of the pain sill.

TABLE 4

| Compound | Dose mg./kg. | % inhibition ±S.E. of the pain sill | Number of animals |
|---|---|---|---|
| Indomethacin | 2.5 | 23±5 | 30 |
| Indomethacin | 5.0 | 40±6 | 30 |
| I/C | 2.5 | 33±5 | 40 |
| I/C | 5.0 | 58±7 | 40 |
| I/D | 2.5 | 25±6 | 35 |
| I/D | 5.0 | 41±5 | 35 |
| I/A | 2.5 | 13±3 | 30 |
| I/A | 5.0 | 26±4 | 30 |
| I/B | 2.5 | 16±6 | 30 |
| I/B | 5.0 | 24±5 | 30 |

5. Determination of the antipyretic action

The determination was carried out on albine rats of both sexes of average weight of 200 g.

The temperature index was determined as represented by the sum of 10 temperature readings effected at 30 min. intervals beginning 1 hour after administration of the pyrogen (0.5 mg./kg. by weight of lipopolysaccharide of E.Coli) less 10 times the basal temperature (reference is made for information about the detailed procedure to C. A. Winter et al., Journal Pharm. Exp. Therap. 141, 369, 1963).

The compounds were suspended in olive oil and orally administered 1 hour before the pyrogen.

TABLE 5

| Compound | Dose mg/kg | Temperature index | Number of animals |
|---|---|---|---|
| Indomethacin | 3.0 | 5.2 | 30 |
| Indomethacin | 6.0 | 3.8 | 30 |
| I/C | 3.0 | 4.1 | 40 |
| I/C | 6.0 | 2.6 | 40 |
| I/D | 3.0 | 4.9 | 35 |
| I/D | 6.0 | 3.2 | 35 |
| I/A | 3.0 | 6.5 | 35 |
| I/A | 6.0 | 4.4 | 35 |
| I/B | 3.0 | 6.9 | 35 |
| I/B | 6.0 | 4.3 | 35 |

CONCLUSIONS

The tested compounds are of a high anti-inflammatory action, as is evidenced by the results of the tests with two types of acute experimental phlogosis; namely, carrageenan and formalin edemas and one type of chronical phlogosis, namely, the foreign body granuloma. They exert moreover analgesic and antipyretic action.

The tested compounds distinguish by a considerably low acute toxicity, so that the therapeutical index is particularly favorable. The most advantageous compound appears to be the 1-p.chlorobenzoyl-2-methyl-5-methoxy-3-indoleacetohydroxamic acid (I/C).

PHARMACEUTICAL PREPARATIONS

The derivatives as hereinbefore described are suitable for both oral and rectal administration, as per the following examples.

A.—Capsules

A gelatine capsule type 2 (Snap-Fit, Parke & Davis) is filled with an intimate mixture of 25 mg. 1-p.chlorobenzoyl-2-methyl-5-methoxy-3-indoleacetohydroxamic acid (I/C), 220 mg. lactose, 4 mg. talcum and 1 mg. magnesium stearate. The weight of the filled capsule is 0.330 g.

B.—Tablets g.

Tablets of 8 mm. diameter are prepared from an intimate mixture of 25 mg. I/C, 220 mg. lactose, 4 g. talcum and 1 g. magnesium stearate per tablet.

C.—Suppositories

Suppositories weighing 1.600 g. are prepared using 50 mg. I/C per suppository and polyethylene glycol as excipient.

Capsules and tablets as described above are used at a typical dosage of 1-2 units three times a day (after meals). For rectal use, 3-4 suppositories daily are indicated.

The excipients indicated hereinbefore are typical for the pharamaceutical preparations according to this invention. It is, however, to be understood that other excipients, inert to the derivative involved, may be found convenient and employed by those skilled in the art.

Warning:—The derivatives of this invention are sensitive to heavy metals and heavy metal compounds. Accordingly, in the preparation of both said derivatives and their pharmaceutical forms any contacts with mechanical parts yielding said metals and compounds are preferably to be avoided; also the excipients used shall be free of said metals and compounds (even in traces). As "heavy metals" are understood herein metals having a density in excess of 5, mainly iron, copper, zinc, lead, tin, bismuth, cadmium, mercury, cobalt, nickel and manganese.

We claim:

1. A 2-methyl-5-methoxy-3-indoleacetohydroxamic acid compound of the formula:

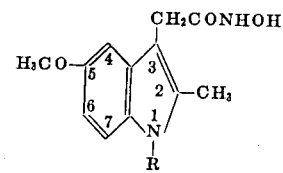

wherein R is a member selected from the group consisting of hydrogen phenyl-methyl, allyl, vinyl, isopropenyl, benzoyl chlorobenzoyl, methoxybenzoyl, and thiomethylbenzoyl.

2. The compound of claim 1 wherein R is allyl.
3. The compound of claim 1 wherein R is phenyl-methyl.
4. The compound of claim 1 wherein R is p-chlorobenzoyl.
5. The compound of claim 1 wherein R is hydrogen.

* * * * *